United States Patent

[11] 3,602,252

[72] Inventor Gene A. Barnes
    Skokie, Ill.
[21] Appl. No. 850,768
[22] Filed Aug. 18, 1969
[45] Patented Aug. 31, 1971
[73] Assignee Eaton Yale & Towne, Inc.
    Cleveland, Ohio

[54] CONSTANT FLOW HEATER VALVE
    9 Claims, 2 Drawing Figs.
[52] U.S. Cl. .................................................. 137/495,
                                                            137/501
[51] Int. Cl. .................................................. G05d 7/01
[50] Field of Search .......................................... 137/495,
                                500, 501, 497, 505.18, 505.13

[56]            References Cited
           UNITED STATES PATENTS
1,743,127  1/1930  Fuller ............................ 137/495
3,477,462  11/1969 Ray .............................. 137/495 X
           FOREIGN PATENTS
26,615    5/1912  Great Britain ................ 137/501
378,038   8/1932  Great Britain ................ 137/505.13

Primary Examiner—M. Cary Nelson
Assistant Examiner—R. B. Rothman
Attorney—Hill, Sherman, Meroni, Gross & Simpson ABSTRACT: A valve which has gradually increasing flow with increasing pressure and a constant flow valve. The increasing flow valve has a shear-type valve at the inlet for adjusting water flow from an automobile engine or the like. The shear-type valve is operated by a vacuum motor and introduces a desired flow rate into a control chamber. The control chamber has a sensor diaphragm disposed thereacross and the pressure across the sensor diaphragm is provided to be the same as the pressure across the shear-type valve at the inlet of the system. Also, a compensator chamber is provided together with a compensator diaphragm. The pressure across the compensator diaphragm is provided to be the same as the pressure across the throttle area associated with the sensor diaphragm. The sensor diaphragm is biased by means of a coil spring away from its outlet thereby tending to open the outlet. Increasing pressure across the shear-type valve causes increasing pressure across the sensor diaphragm which tends to throttle the flow and thereby close the outlet. However, the pressure across the throttle is also the same pressure which is across the compensator diaphragm and which is oppositely directed. The compensator diaphragm has a larger area than the throttle area, and accordingly increasing pressure tends to increase the flow by opening the sensor diaphragm. The effect is similar to increasing the spring force on the sensor diaphragm with increasing pressure at the inlet. The constant flow valve has a butterfly plate which is operated by a vacuum motor and which has a diaphragm disposed in the path of the liquid flow and which thereby uses the liquid flow to oppose the action of the vacuum motor on the butterfly plate. In this way the action of the flow is opposed to the opening of the butterfly valve and accordingly a constant rate of flow from the inlet to the outlet is maintained.

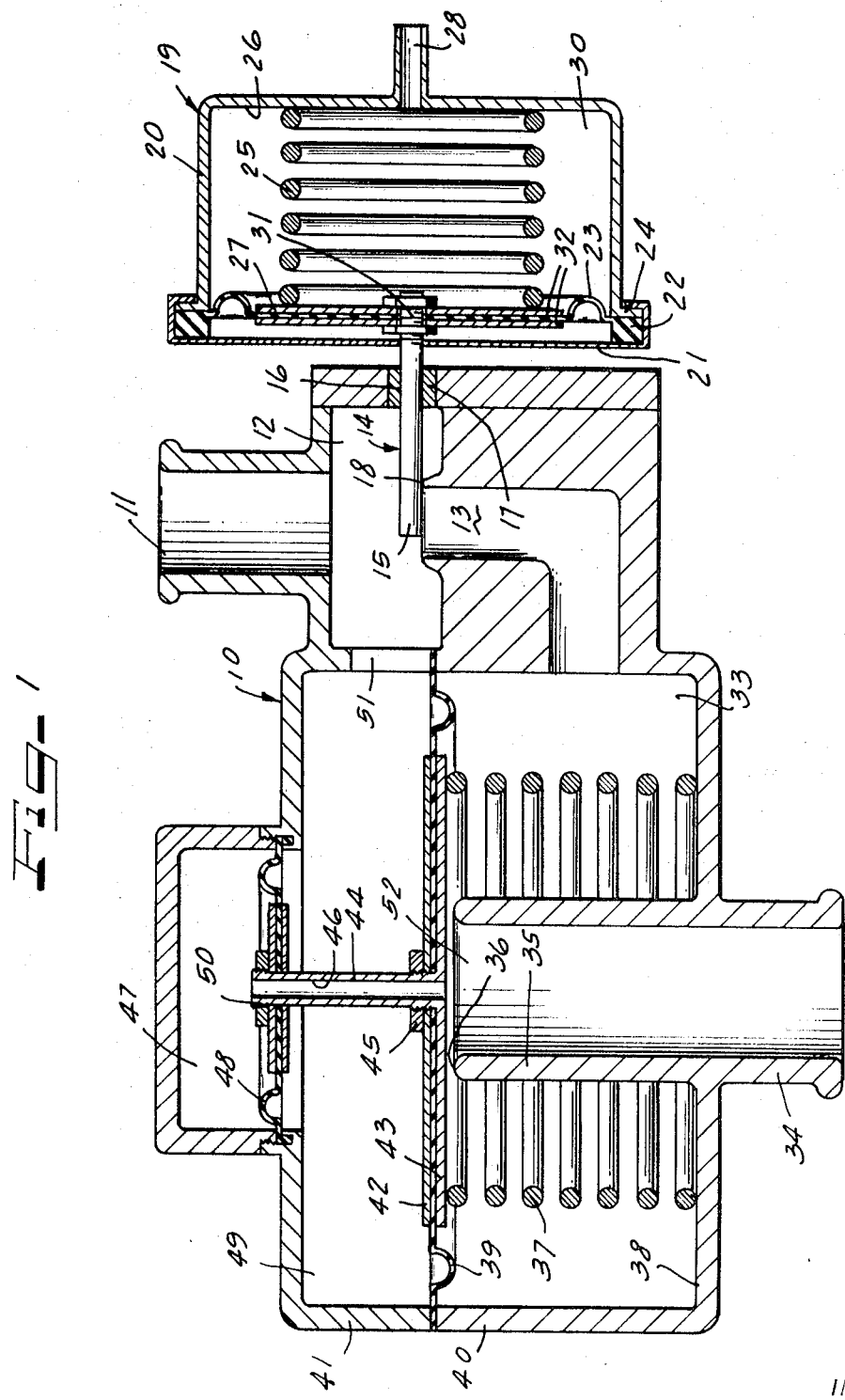

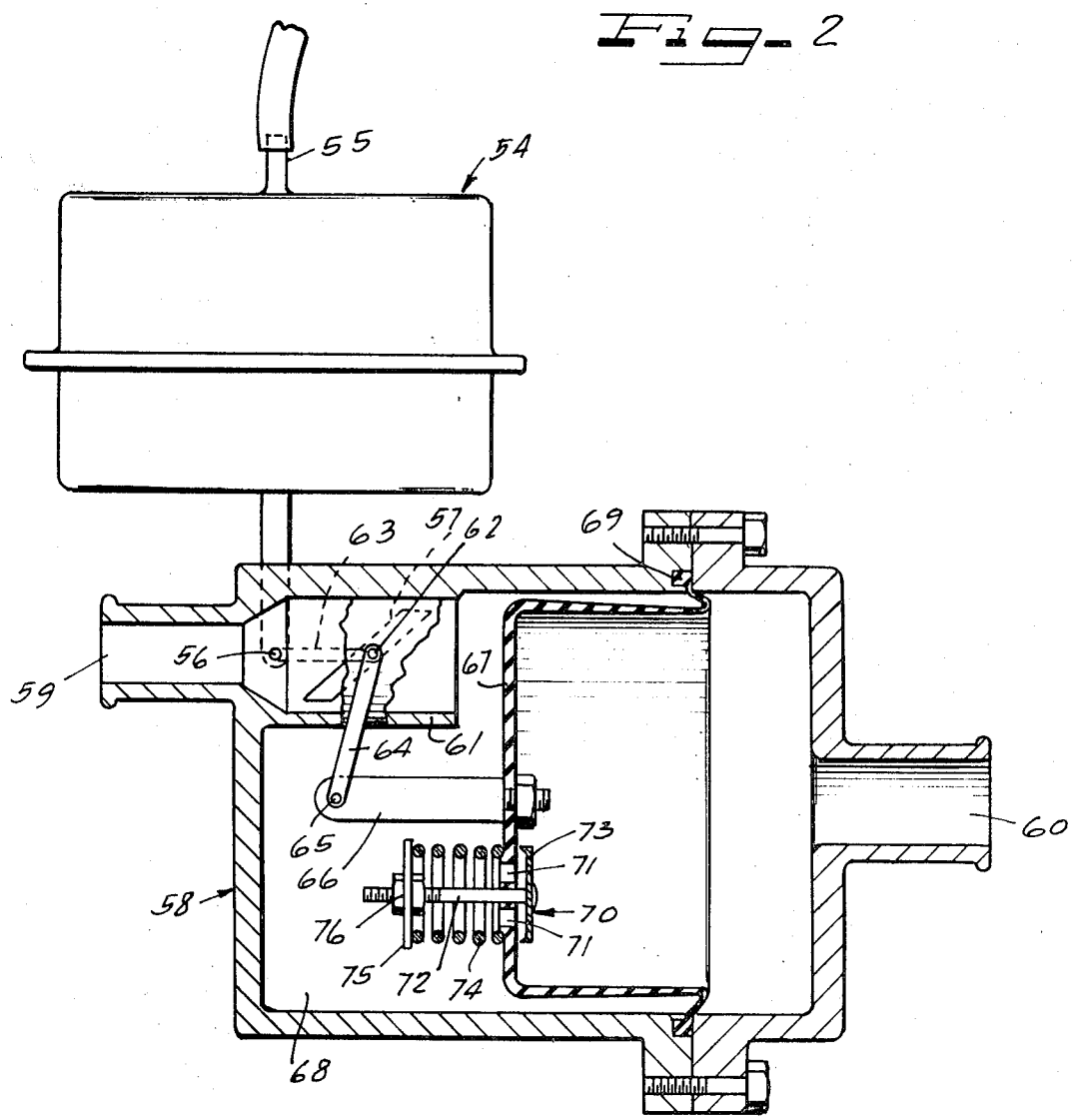

CONSTANT FLOW HEATER VALVE

BACKGROUND OF THE INVENTION

Field of the Invention

The field of art to which this invention pertains is water flow valves and means for regulating the rate of the flow with increasing pressure at the inlet for uses such as in automobile heating systems where water pressure is variable with increasing engine speeds and the like.

SUMMARY OF THE INVENTION

It is an important feature of the present invention to provide an improved valve means for regulating the rate of flow of fluid in a system in response to changes in inlet pressure to the system.

It is another object of the present invention to provide a control valve which has a gradually increasing flow with increasing pressure.

It is a further object of the present invention to provide a control valve having a shear-type valve at the inlet which has a pressure drop thereacross which is substantially equal to the pressure drop across a sensor diaphragm and wherein the sensor diaphragm is used to throttle the flow from the inlet to the outlet.

It is an additional object of the present invention to provide a control valve as described above wherein a compensator diaphragm is used in conjunction with the sensor diaphragm and wherein the pressure drop normally across the compensator diaphragm is substantially equal to the pressure drop across the throttling area of the sensor diaphragm such that increasing pressure at the inlet to the valve tends to open the sensor diaphragm to allow increasing flow.

It is a further object of the present invention to provide a constant flow valve utilizing a butterfly plate which is balanced between an input flow control signal and the flow pressure.

It is also an object of the present invention to provide a constant flow valve as described above wherein the flow pressure acting on a sensor diaphragm tends to close the butterfly plate, while vacuum pressure acting on a vacuum motor tends to open the butterfly plate whereby increasing pressure tends to maintain a uniform flow through the valve.

It is an additional object of the present invention to provide a constant flow valve as described above which includes the use of a relief valve disposed in the surface of the diaphragm to increase the sensitivity of the control valve over a wide range of flows.

These and other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a sectional view through a flow control valve according to the present invention which provides for a gradually increasing flow with increasing pressure across the inlet of the valve.

FIG. 2 is a sectional view through a constant flow valve according to the present invention which shows the butterfly plate and associated linkage apparatus in connection with a sensor diaphragm and a relief valve, all to provide a constant flow rate regardless of increasing or decreasing input pressures to the system.

DESCRIPTION OF THE PREFERRED EMBODIMENT

The control valves of the present invention provide means for establishing either a constant flow in response to variable input pressures in a fluid control system or to provide gradually increasing flow in response to increasing pressure at the inlet of a valve.

In FIG. 1, a control valve 10 has an inlet 11 which may be referred to as a water inlet which leads to a chamber 12. The chamber 12 has an outlet passageway 13 and a shear-type valve arrangement 14.

The shear-type valve arrangement includes a shear valve member 15 which is slidably supported at 16 within a seal 17. The shear-type valve 15 is moved to and fro against a seat 18 formed at the outlet 13 of the chamber 12.

The to and fro motion of the shear type valve 15 is accomplished by a vacuum motor 19 which has a housing 20 and a face plate 21. The housing 20 is secured to the faceplate 21 at a seal ring 22 essentially as shown. A diaphragm 23 is disposed against the seal ring 22 and between the seal ring and a flange 24 of the housing 19. The diaphragm is spring loaded by means of a coil spring 25 which is seated at the rear face 26 of the housing 19 and at the associated surface 27 of the diaphragm. A vacuum inlet 28 is provided as is well understood.

Changes in vacuum at the inlet 28 will cause the diaphragm 23 to move to and fro within the chamber 30 formed within the housing 19 and accordingly move the shear-type valve 15 with it. The shear-type valve 15 is secured as at 31 to the diaphragm 23. The diaphragm 23, of course, has reinforcement plates such as the plates 32.

Since in an automobile control system, the vacuum within the chamber 30 can be selected quite easily using vacuum from the intake manifold, the position of the shear valve 15 can be readily established to regulate a given flow through the valve.

The outlet of the chamber 12 is also an inlet for a control chamber 33. The control chamber 33 has an outlet 34 which includes a cylindrical wall portion 35 extending upwardly within the interior of the control chamber 33. The wall portion 35 has a seat 36 formed at the upper surface thereof.

A coil spring 37 is disposed about the cylindrical portion 35 and is seated at the inner surface 38 of the chamber 33.

A sensor diaphragm 39 is disposed across the interior of the chamber and is secured between a lower section 40 and an upper section 41 of the valve assembly.

The sensor diaphragm 39 has reinforcement plates 42 and 43 as shown which are secured to an actuation or coupling rod 44. The coupling rod 44 is coupled by means of a locknut 45 to the sensor diaphragm 39 and has a hollow interior as at 46 for coupling pressure from the control chamber 33 therethrough to a compensation chamber 47.

A second diaphragm, referred to herein as a compensator diaphragm 48 is disposed as shown in FIG. 1 to form the compensator chamber 47 and a pressure chamber 49. The pressure chamber 49 is located intermediate the compensator chamber 47 and the control chamber 33.

The actuator or coupling rod 44 is coupled to the compensator diaphragm 48 as at 50 in substantially the same manner as the coupling of the rod to the diaphragm 39. The diaphragm 48 is substantially identical to the diaphragm 39, and no further description is required.

Accordingly, it will be appreciated that pressure within the control chamber 33 will be substantially identical to the pressure within the compensator chamber 47. It will also be appreciated that pressure across the sensor diaphragm 39 will be substantially equal to the pressure across the shear-type valve 15. This is because the chamber 12 associated with the shear-type valve 15 is coupled through a port 51 directly to the pressure chamber 49. Also, the pressure of the outlet 13 is also coupled to the control chamber 33. Hence, the pressure across the shear-type valve 15 will be substantially identical to the pressure across the sensor diaphragm 39. Also, since the coupling rod 44 couples pressure from the throttling area 52 directly to the compensator chamber 47, the pressure across the compensator diaphragm 48 will be substantially equal to the pressure across the throttle area of the sensor diaphragm 39.

With a given vacuum signal to the vacuum motor 19, the diaphragm 27 will be caused to stroke which will cause the shear valve 15 to assume a given position and thus set a given area for the valve. As explained, it can be readily seen that the sensor diaphragm 39 is subjected to the same pressure drop as the area adjustment of the shear valve 15. Thus with increasing pressure at the inlet 11, the flow and consequently the pressure drop across the area adjustment of the shear valve 15 will increase to the point that the spring force on the sensor diaphragm 39 is overcome to begin to throttle the flow. As the pressure tends to increase there would normally be a tendency for the flow to increase but a flow increase would give rise to an increase in the pressure drop across the sensor diaphragm 39 thus causing the throttle to start to close thereby generating a flow decrease.

If the spring force were the only force acting on the sensor diaphragm, constant flow would be maintained, but as pointed out, previously, the compensator diaphragm 48 is arranged such that an increasing pressure at the valve inlet 11 has the same effect as increasing the spring force on the sensor diaphragm 39. An increase in the spring force would cause the throttle of the diaphragm 39 to open until the flow and the pressure drop increases to a new equilibrium. The difference in area between the compensator diaphragm 48 and the throttle area 52 of the sensor diaphragm 39 coupled with the initial spring force of the spring 37 will determine the rate of increase in flow with pressure at the inlet to the valve.

To adjust the valve, the vacuum at the vacuum motor 19 is changed which will cause an increase or decrease in the area at the area adjustment of the shear valve 15 which will change the flow to a new equilibrium at the same pressure drop.

The constant pressure valve shown in FIG. 2 includes a vacuum motor 54 which has an inlet 55 which may be coupled thereto from a vacuum supply such as found at the intake manifold of an internal combustion engine. A linkage 55 extends from the vacuum motor to a pivot point 56 associated with a butterfly plate 57. The vacuum motor may be of a standard type and may be similar to the vacuum motor shown in FIG. 1.

The body portion of the valve consists of a chamber 58 which has an inlet 59 and an outlet 60. The inlet 59 has a sleeve portion 61 as an extension thereof and has the butterfly plate 57 pivotally supported as at 62 therein. It is apparent that by pivoting the butterfly plate counterclockwise, the flow through the inlet will be closed, and by pivoting the butterfly plate clockwise, the flow through the inlet will be increased depending upon the position of the butterfly plate.

A linkage is coupled from the point 56 to the point 62, the linkage being referred to by reference numeral 63. A further linkage 64 is coupled from the pivot point 62 to a further pivot point 65.

The pivot point 65 is associated with a coupling rod or actuator rod 66 of a pressure-sensing diaphragm 67. The pressure-sensing diaphragm is disposed across a control chamber 68 which is formed interiorly of the housing 58.

The pressure-sensing diaphragm 67 is secured in a well-known manner as shown at 69.

A relief valve 70 is formed within a wall of the pressure-sensing diaphragm and essentially consists of a series of openings 71, a valve rod 72 which extends through the diaphragm and which has a valve head 73 disposed at one side thereof, and a biasing spring 74 disposed at the other side thereof. The biasing spring 74 acts against the diaphragm and against a backup plate 75 which is rigidly secured as at 76 to the valve stem 72. In this way, the valve head 73 is normally closed against the diaphragm, thereby closing the flow of fluid through the ports 71.

From the above description, it will be apparent that increasing vacuum to the vacuum motor 54 tends to open the butterfly plate 57 thereby increasing the flow of fluid through the inlet 59. However, increasing flow, tends to increase the pressure on the pressure-sensing diaphragm 67 which tends to move the diaphragm to the right thereby pivoting the butterfly plate 57 and closing the flow of fluid therethrough.

By providing the relief valve 70, the sensitivity of the device is increased over a wider range of flows. In particular, the relief valve opens with increasing pressure thereby increasing the flow through the system for cases where high pressure exists which otherwise would impede the flow by tending to close the butterfly plate 57.

Both of the valves shown in FIGS. 1 and 2 provide improved flow characteristics for variable input water pressures such as pressures that are characteristically found in water-circulating systems of internal combustion engines.

I claim as my invention:

1. A flow control valve comprising:
   a valve body having a control chamber,
   an inlet leading to said control chamber and an outlet leading therefrom,
   valve adjustment means at the inlet for regulating the rate of flow to said control chamber,
   said control chamber having a sensor diaphragm disposed as one wall thereof,
   said sensor diaphragm engaging said outlet and maintaining a throttling action therewith,
   said valve body also having a pressure chamber and a compensator chamber,
   said pressure chamber having said sensor diaphragm as one wall thereof and having a compensator diaphragm as a second wall thereof,
   said compensator diaphragm forming a common wall between said pressure chamber and said compensator chamber,
   means mechanically interconnecting said sensor and compensator diaphragms to cause both diaphragms to move together,
   means communicating fluid from said inlet upstream of said valve adjustment means to said pressure chamber, and
   means communicating fluid and pressure from said control chamber to said compensator chamber.

2. A flow control valve in accordance with claim 1 wherein said throttling action occurs over a limited surface area of said sensor diaphragm and wherein said limited surface area is less than the surface area of said compensator diaphragm.

3. A flow control valve in accordance with claim 2 wherein said sensor and compensator diaphragm are rigidly coupled to move together.

4. A flow control valve in accordance with claim 3 wherein a coupling rod extends from said control clamber to said compensator chamber and wherein said means for communicating fluid pressure from said control chamber to said compensator chamber comprises a passageway formed internally of said coupling rod.

5. A flow control valve comprising:
   a valve body having a cavity formed therein,
   said cavity having an inlet and an outlet,
   a pair of diaphragms disposed within said cavity and dividing the same into three chambers,
   the outer two of said three chambers communicating with said outlet and the intermediate chamber communicating with said inlet,
   means coupling the two diaphragms to move together,
   one of said diaphragms disposed to have a throttling action with said outlet, and
   means biasing said one diaphragm away from said outlet.

6. A flow control valve in accordance with claim 5 wherein said means biasing said one diaphragm comprises a coil spring disposed between said diaphragm and a wall of said cavity and wherein said means coupling the two diaphragms comprises a hollow tubing communicating fluid from the outlet to the side of said other diaphragm oppositely of said intermediate chamber.

7. A flow control valve comprising a valve body having a cavity with an inlet and an outlet,
   a pair of diaphragms subdividing said cavity into first, second and third consecutive chambers,
   the first diaphragm dividing the first and second chambers being larger than the second diaphragm dividing the second and third chambers, means mechanically interconnecting said first and second diaphragms to cause both diaphragms to move together, the first diaphragm having a portion generally overlying said outlet, said portion of said first diaphragm having less surface area than said second diaphragm, said inlet communicating with said first and second chambers, a low pressure throttling area formed in the vicinity of said outlet at said first diaphragm portion, and said low pressure throttling area being communicable with said third chamber, whereby increasing pressure at said inlet causes increasing flow at said outlet.

8. A flow control valve in accordance with claim 7 wherein said first and second diaphragms are rigidly coupled by a hollow conductive tubing.

9. A flow control valve in accordance with claim 8 wherein a shear-type area adjustment valve is disposed between the inlet and the communication path of said inlet with said first chamber.